US008933575B2

(12) United States Patent
Lipman (10) Patent No.: US 8,933,575 B2
(45) Date of Patent: Jan. 13, 2015

(54) WATER TURBINE WITH PIVOTABLE BLADES (71) Applicant: Harold Lipman, Delray Beach, FL (US)

(72) Inventor: Harold Lipman, Delray Beach, FL (US)

( * ) Notice: Subject to any disclaimer, the term of this patent is extended or adjusted under 35 U.S.C. 154(b) by 4 days.

(21) Appl. No.: 13/760,430

(22) Filed: Feb. 6, 2013

(65) Prior Publication Data
US 2014/0217738 A1 Aug. 7, 2014

(51) Int. Cl.
F03B 13/10 (2006.01)
F03B 17/06 (2006.01)

(52) U.S. Cl.
CPC ................................ *F03B 17/06* (2013.01)
USPC .............................. 290/54; 415/4.2; 416/117

(58) Field of Classification Search
CPC ..... Y02E 10/28; Y02E 10/223; F03B 17/065; F03B 17/062; F03B 7/00
USPC ..................................... 290/54; 416/117–119
See application file for complete search history.

(56) References Cited

U.S. PATENT DOCUMENTS

| 302,769 | A | * | 7/1884 | Pallausch | 416/119 |
| 391,539 | A | * | 10/1888 | Lard | 416/118 |
| 3,992,125 | A | | 11/1976 | Schilling | |
| 4,048,947 | A | | 9/1977 | Sicard | |
| 4,095,422 | A | | 6/1978 | Kurakake | |
| 4,104,536 | A | | 8/1978 | Gutsfeld | |
| 4,383,797 | A | | 5/1983 | Lee | |
| 4,424,451 | A | | 1/1984 | Schmidt | |
| 5,051,059 | A | * | 9/1991 | Rademacher | 415/7 |
| 5,098,264 | A | * | 3/1992 | Lew | 418/23 |
| 5,947,678 | A | | 9/1999 | Bergstein | |
| 6,877,968 | B2 | | 4/2005 | Godsall | |
| 7,855,468 | B2 | | 12/2010 | Lin | |
| 8,419,367 | B2 | * | 4/2013 | Fite | 416/119 |
| 2008/0008587 | A1 | | 1/2008 | Siegel | |
| 2008/0231057 | A1 | * | 9/2008 | Zeuner | 290/54 |
| 2009/0010761 | A1 | | 1/2009 | Schiel | |
| 2010/0237626 | A1 | | 9/2010 | Hamner | |
| 2011/0062715 | A1 | | 3/2011 | Dimaggio | |
| 2011/0225970 | A1 | | 9/2011 | Isik | |
| 2011/0272946 | A1 | * | 11/2011 | Kumano | 290/54 |

FOREIGN PATENT DOCUMENTS

| DE | 327120 | 10/1920 |
| DE | 3133726 A1 | 3/1983 |
| DE | 19708636 A1 | 4/1998 |
| DE | 102006059944 A1 | 6/2008 |
| EP | 2078849 A2 | 7/2009 |
| FR | 2162840 A5 | 7/1973 |
| GB | 62244099 A | 11/1991 |
| GB | 2435908 A | 9/2007 |
| GB | 2452484 A | 3/2009 |

(Continued)

*Primary Examiner* — Michael Zarroli
(74) *Attorney, Agent, or Firm* — The Belles Group, P.C.

(57) ABSTRACT

A hydroelectric machine and system is disclosed comprising an electric generator and water turbine configured for direct immersion into a naturally flowing body of water such as the ocean, stream, or a tidal basin. In one embodiment, the water turbine includes a rotor having plurality of pivotably moveable blades which sequentially open and close to capture fluid or kinetic energy when exposed to the water current from any direction. In one embodiment, the blades are arranged in overlapping relationship to maximize the number of blades and active blade surface area for capturing fluid energy and reducing flow turbulence around the water turbine. Various embodiments include arcuately curved blades and reverse curved trailing edges for early capture of fluid and initiation of the blade extension outwards from the rotor.

20 Claims, 7 Drawing Sheets

(56) References Cited

FOREIGN PATENT DOCUMENTS

| | | | |
|---|---|---|---|
| GB | 2480129 A | 11/2011 | |
| JP | 58117363 A | 7/1983 | |
| JP | 2006077684 A | 3/2006 | |
| WO | WO2008002149 A1 | 1/2008 | |
| WO | WO2009142523 A2 | 11/2009 | |
| WO | WO2010130901 A2 | 11/2010 | |
| WO | WO2011028187 A2 | 3/2011 | |
| WO | WO2011097747 A2 | 8/2011 | |
| WO | WO2012007686 A1 | 1/2012 | |
| WO | WO2012061948 A2 | 5/2012 | |

\* cited by examiner

FIG. 10 ial power. Some designs require the water to be captured and directed to the water turbine through confined fluid flow channels, conduits or boxes. Such arrangements add complexity to the hydropower installation, may be capital intensive, and sometimes may be harmful to the environment or natural habitat.

WATER TURBINE WITH PIVOTABLE BLADES

FIELD OF THE INVENTION

The invention generally relates to water hydro or water turbines.

BACKGROUND OF THE INVENTION

Hydroelectric power represents a renewable energy source in which a water turbine is utilized to convert a moving fluid into useful electrical power. Some designs require the water to be captured and directed to the water turbine through confined fluid flow channels, conduits or boxes. Such arrangements add complexity to the hydropower installation, may be capital intensive, and sometimes may be harmful to the environment or natural habitat.

A water turbine is desirable that can be directly immersed into an open flowing body of water to take advantage of naturally occurring moving currents with minimal disruption to the natural environment.

SUMMARY OF THE INVENTION

The present disclosure describes embodiments of a hydroelectric power system including at least one water turbine having a plurality of pivotably openable and foldable blades that is configured for placement in any flowing body of water. Accordingly, the water turbine disclosed herein does not require flow diversion or funneling baffles to capture and harness the fluid energy of the moving current or stream for conversion to useful electric power.

Embodiments of the water turbine are ideally suited for application in a tidal basin where the water flow and current changes direction over the course of the day. The rotor of the water turbine will rotate in the same direction regardless of whether the tide is flowing in towards land or out since the turbine rotation is independent of the flow's direction. When the tide is flowing in, the blades on one half of the water turbine rotor will be opened automatically by the tidal flow and when the tide is flowing out, the blades on the opposing one half of the water turbine rotor will be opened automatically which will harvest kinetic energy from the flow going in both opposing directions, as further described herein.

According to one aspect of the present disclosure, a water turbine configured for immersion in a flowing body of water is provided. The water turbine includes a rotatable cylindrical rotor including a drive shaft defining an axis of rotation, and a plurality of arcuately curved blades pivotably mounted to rotor, the blades each being moveable between a retracted closed position and an extended open position operable for capturing flowing water. The blades are configured and arranged so that each blade at least partially overlaps an adjacent blade when in the closed position in one embodiment. The blades sequentially move between the closed and open positions as the rotor rotates when exposed to flowing water which impinges an underside portion of the blades. In one embodiment, the blades include a reverse curvature section that is configured and operable to capture flowing water for initiating pivotable movement of the blades outwards from the rotor to the open position.

According to another aspect of the present disclosure, a hydroelectric machine is provided. The hydroelectric machine includes an electric generator, a rotatable tubular rotor including a drive shaft coupled directly or indirectly to the generator, the rotor being configured for immersion in flowing water, and a plurality of arcuately curved blades pivotably mounted to rotor. The blades are each moveable between a retracted closed position and an extended open position for capturing the flowing water. In one embodiment, the blades are configured and arranged so that each blade at least partially overlaps an adjacent blade when in the closed position. The blades sequentially move between the closed and open positions as the rotor rotates when exposed to flowing water.

According to another aspect of the present disclosure, a method for capturing fluid energy from flowing water is provided. The method includes the steps of: providing a water turbine including a substantially hollow cylindrical rotor having a plurality of blades pivotably coupled to the rotor, the blades each being moveable between closed and open positions; immersing the water turbine into a body of flowing water; pivoting at least one blade outwards from the rotor by exposing the blade to the flowing water; engaging an interior surface of the rotor with a stop portion of the blade; and rotating the rotor about a rotational axis. In one embodiment, each blade at least partially overlaps an adjacent blade when in the closed position disposed proximate to the rotor.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

All drawings referenced herein are schematic in nature and not to scale.

DETAILED DESCRIPTION OF THE PREFERRED EMBODIMENTS

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected," "interconnected," "attached," "coupled," etc. refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein.

Figure 1:
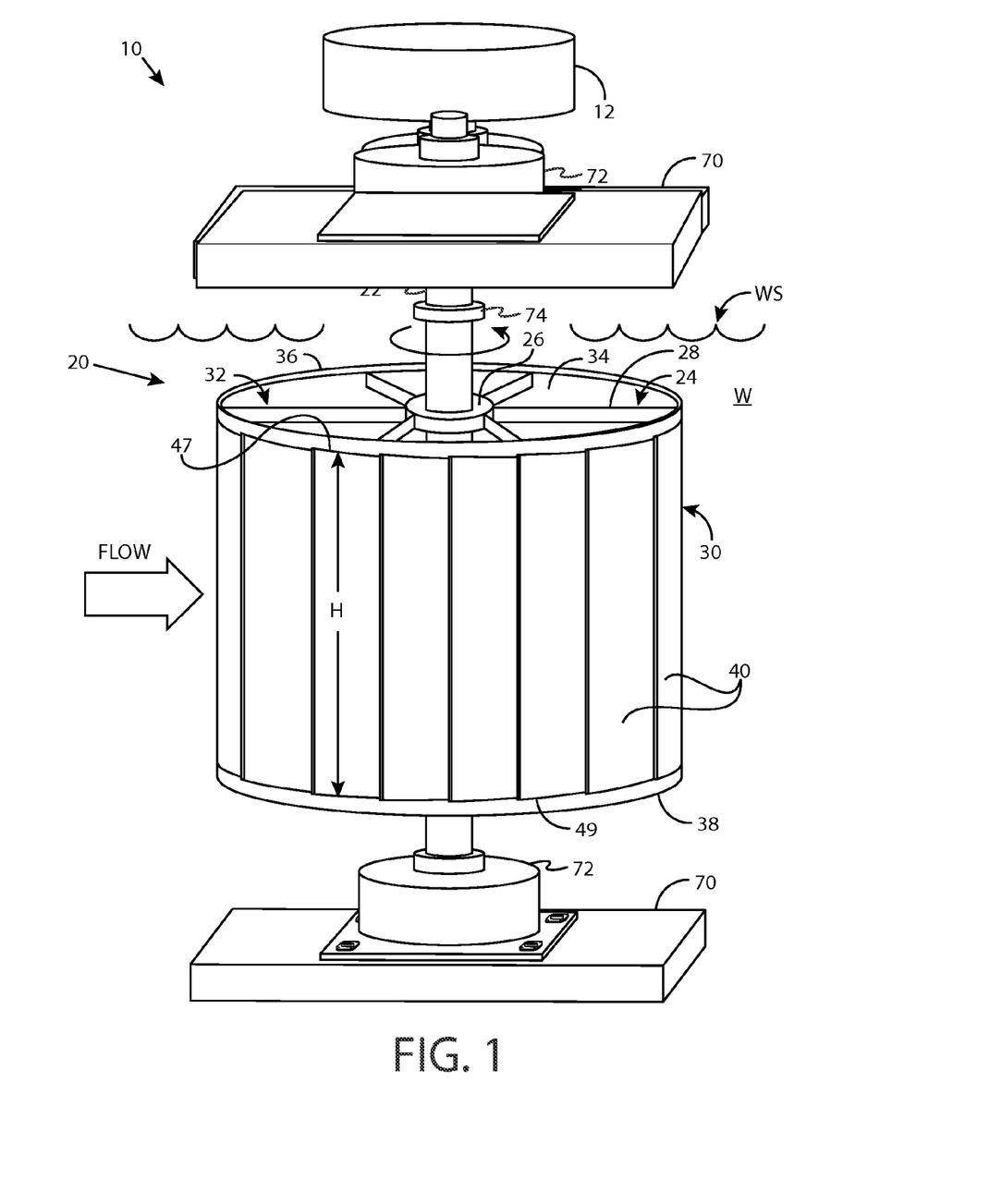
FIG. 1 is an isometric elevation view of a hydroelectric machine according to the present disclosure including a water turbine and electric generator.

FIG. 1 shows one embodiment of a hydroelectric system in the form of a hydroelectric machine 10 including a water turbine 20 provided according to principles of the present disclosure which is configured for direct immersion into a flowing body of water such as the ocean, tidal basin or a stream to take advantage of and capture energy from naturally occurring currents.

Referring to FIG. 1, hydroelectric machine 10 generally includes water turbine 20 and electric generator 12 operably coupled to the turbine via a drive shaft 22. Water turbine 20 includes a rotatable rotor 30 having an open tubular or hollow cylindrical configuration defining an open central interior space 32 bounded by a circumferentially extending circular sidewall 34. Rotor 30 further includes top and bottom ends 36, 38, which in one embodiment without limitation may each be open allowing water to fill interior space 32. In other embodiments, the top and/or bottom ends 36, 38 may be partially or fully closed. Rotor 30 is fully immersible into a flowing body of water W beneath the surface WS of the water as shown, and oriented in one embodiment so that the ends 36, 38 are spaced vertically apart when the rotor is deployed.

Figure 2:
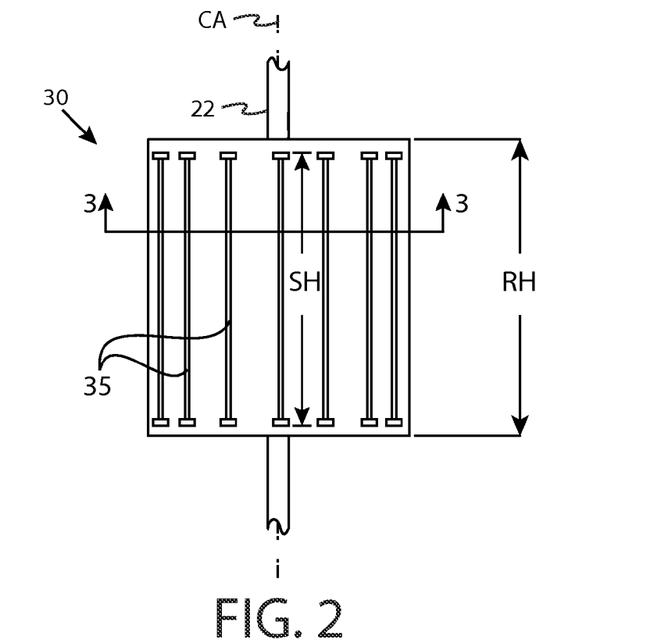
FIG. 2 is a side elevation view of a rotor of the water turbine of FIG. 1.

The rotor 30 assembly includes drive shaft 22 defining a central axis of rotation CA as shown in FIGS. 1 and 2. Rotor 30 is preferably rigidly and fixedly connected to shaft 22 so that the shaft rotates in synchronization with the rotor. Rotor 30 may be connected to shaft 22 by any suitable method used in the art. In one embodiment, without limitation, a rotor support structure 24 is provided including a central hub 26 rigidly attached to shaft 22 and a plurality of radially extending and angularly spaced spokes 28 connecting the hub to the sidewall 36 of rotor 30. Rotor 30 is fully supported by shaft 22 via support structure 24 as shown. Although a single support structure 24 is visible in FIG. 1 near top end 36 of rotor 30, in some embodiments a second support structure 24 may be provided adjacent bottom end 38 (not visible) and/or at intermediate locations between the top and bottom ends of the rotor. It will be appreciated that any suitable number, arrangement, and type of support structure 24 may be provided in various embodiments contemplated so long as the rotor 30 may be appropriately supported by the shaft 22 for rotational movement therewith and with minimal distortion when exposed to the forces produces by a moving current flowing over the rotor and blades 40. Accordingly, possible embodiments of a rotor support structure according to the present disclosure are expressly not limited to the single example of a support structure illustrated and described herein.

Drive shaft 22 of rotor 30 may be directly coupled to generator 12 as shown in FIG. 1 or indirectly through a geared transmission or differential unit as are well known in the art. This provides the ability to step up or step down the mechanical rotation of drive shaft 22 as needed for coupling to the generator. Accordingly, embodiments of the present disclosure are not limited to any particular type of coupling arrangement between the rotor 30 and generator 12.

Figure 3:
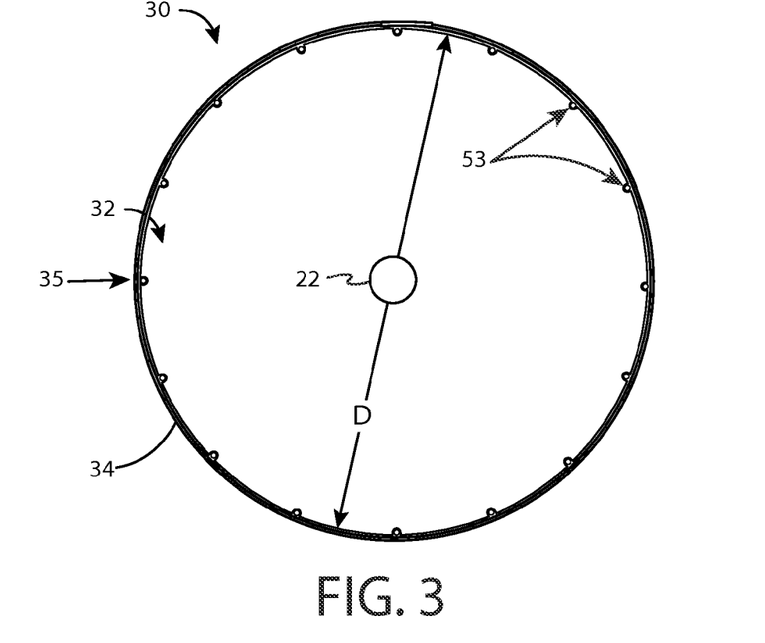
FIG. 3 is a top plan view thereof.

FIG. 2 shows a side view of the rotor 30 and shaft 22 assembly alone. FIG. 3 is a cross section taken along line 3-3 in FIG. 2.

Referring to FIGS. 1-3, rotor 30 has a height RH and diameter D. As further described herein, the number and size of blades 40 to be provided will depend in part on the diameter D and height RH, as well has the available and/or desired depth of the body of water W into which the water turbine 20 will be placed for operation. Rotor 30 includes a plurality of vertically extending slots 35 formed in sidewall 34. In one embodiment, the slots 35 may extend completely through sidewall 35 and penetrate into the central interior space 32 of rotor 30 to accommodate blades 40, as further described herein. In one embodiment, slots 35 have a height SH which is less than the height RH of rotor 30 so that the slots do not completely penetrate the top and bottom ends 36, 38 of sidewall 34. This provides a material purchase proximate to the top and bottom ends of the rotor sidewall 34 for pivotably mounting blades 40 thereto. In one preferred embodiment, slots 35 are preferably spaced equidistant around the circumference of rotor 30.

Figure 5:
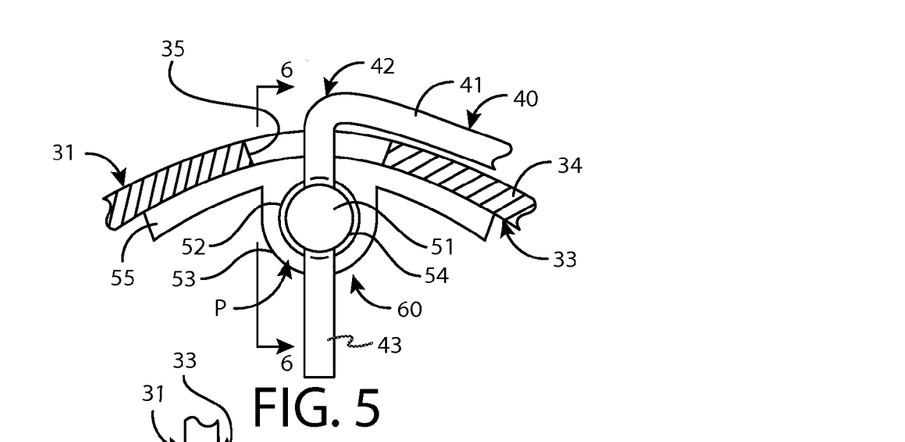
FIG. 5 is a detailed cross-sectional partial top view of a blade mounting assembly including the rotor and blade.
Figure 6:
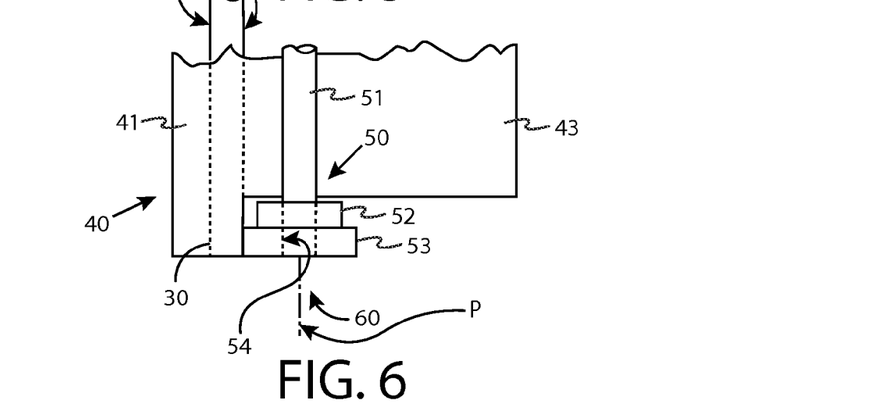
FIG. 6 is a detailed cross-sectional partial side elevation view thereof taken along lines 6-6 in FIG. 5.
Figure 7:
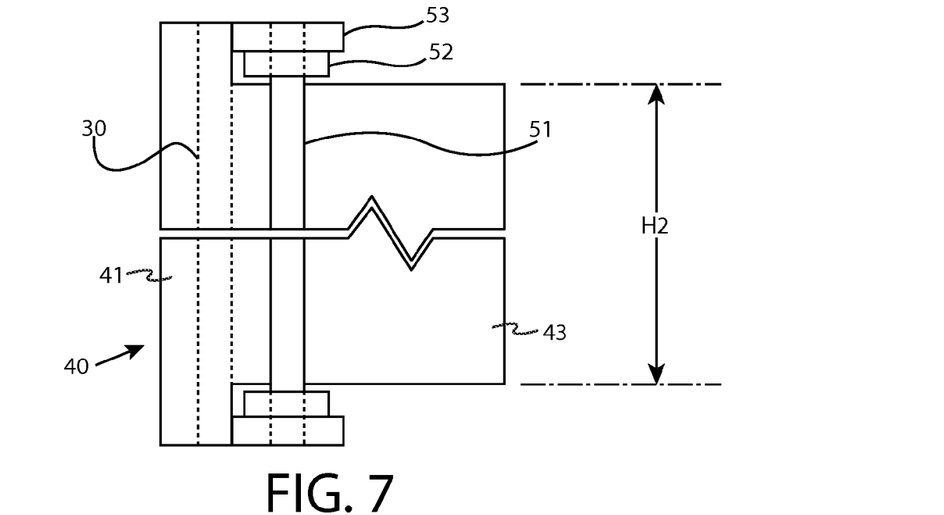
FIG. 7 is a full side elevation view of the blade mounting assembly.

It should be noted that in some embodiments, the exterior operating portion 41 of the blades 40 may still have a vertical height H that is substantially equal to and coextensive with the rotor height RH as shown in FIGS. 6 and 7 to provide the greatest kinetic energy capture possible. Accordingly, in some embodiments as best shown in FIG. 7, the stop portion 43 of the blades 40 may have a vertical height H2 that is less than the vertical height H of the operating portion 41 of the blade thereby forming a stepped or notched portion near the top and bottom of the operating portions 41. The stop portion 43 of blade 40 with a lower height H2 therefore extends inwards through the slot 35 in rotor 30 whereas the greater height H operating portion 41 remains substantially outside the rotor (see FIGS. 5-7). The stop portions 43 need only have a height H2 sufficient to effectively brace the fully opened blade 40 against the rotor 30, as further described herein.

In certain embodiments, the blade stop portion 43 may vertically continuous in structure over its height H2 as shown in FIG. 7. In other embodiments contemplated, blade stop portion 43 may be comprised of a plurality of vertically spaced apart tabs disposed on operating portion 41 of the blades and extending intermittently along height H2 projecting inwards through slot 35. Accordingly, the blade stop portion 43 need not necessarily be a continuous single vertical structure in this latter embodiment thereby providing the benefit of reducing the weight of each blade 40 which will require less kinetic energy to open/close the blades in operation making the water turbine 20 more efficient.

Whether constructed as a single continuous element or comprised of a plurality of vertically spaced apart tabs, stop portion 43 has a total combined height that is preferably less than the height of slot 35 in rotor 30. In certain embodiments where stop portion 43 is formed from a plurality of tabs, slot 35 may be comprised of a plurality of vertically spaced apart elongated openings each being positioned for receiving a corresponding tab therethrough in lieu of slot 35 being a continuous vertical slot. Accordingly, there are numerous possible configurations of mounting portion 43 of the blades 40 and slot 35 within the scope of the present disclosure and equivalents.

Figure 8:
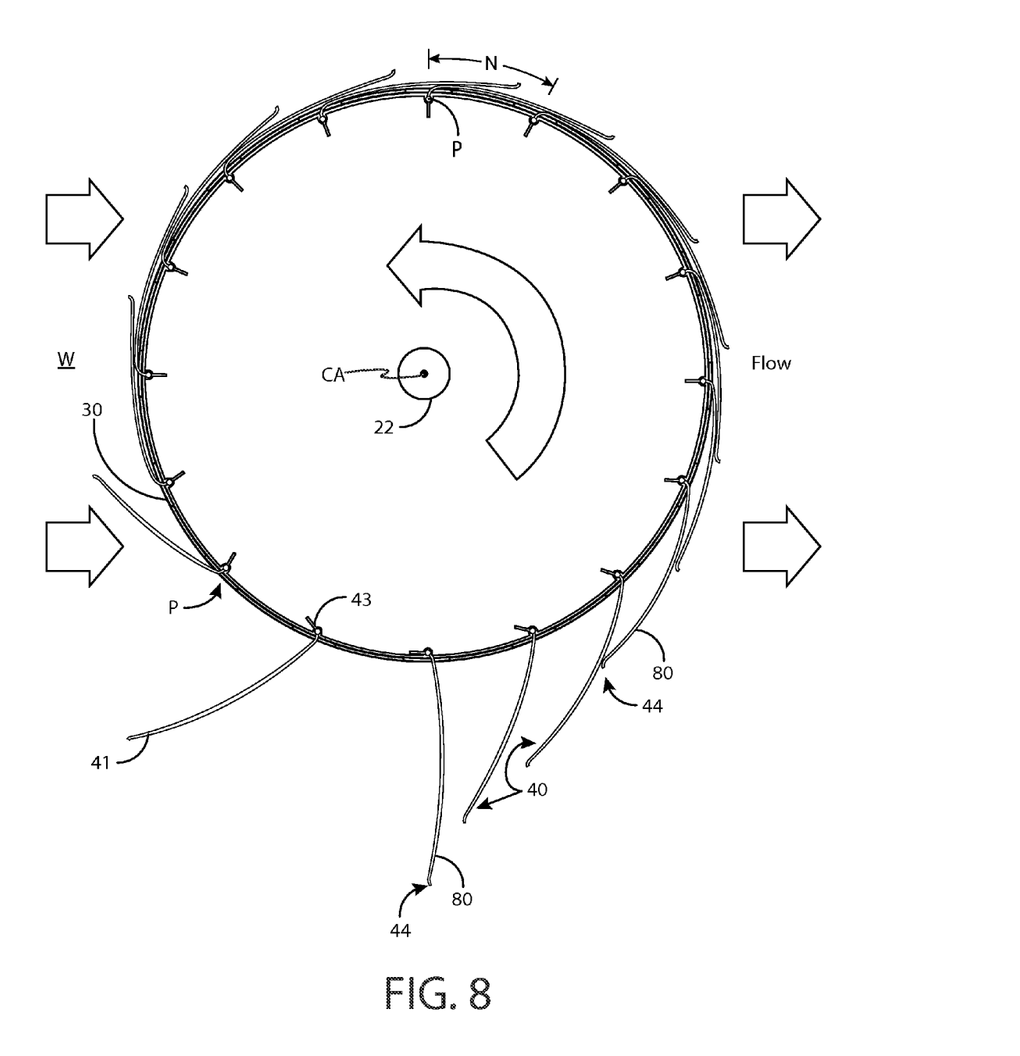
FIG. 8 is a top plan view of the water turbine of FIG. 1 showing the blades in operation between closed and open positions in a body of water.

Referring back to FIG. 1, the plurality of pivotable blades 40 are movably disposed and coupled to the rotor 32 at the sidewall 34. Blades 40 are moveable (e.g. openable and closeable as shown in FIG. 8) with respect to the rotor 30 in response to being acted upon by forces produced by the water flowing against and impinging the blades. Accordingly, each blade 40 is moveable between an extended active open position wherein the free trailing edge 44 of the blade is spaced by a maximum radial distance outwards from rotor 30 and a collapsed or retracted inactive position wherein the body of the blade and trailing edge is disposed more proximate to the rotor 30 (see, e.g. FIG. 8). Blades 40 are arranged around the circumference or perimeter of rotor sidewall 34 and oriented so that the blades extend and retract in a radial direction in response to the forces of the flowing water against the blades. The direction of the current or flow determines whether the blades 40 pivot open away from rotor 30 or closed towards the rotor.

In one embodiment, blades 40 are freely pivoting with respect to and when coupled to rotor 30 for movement between the closed and open positions (see, e.g. FIG. 8). The blades automatically move between the closed and open position when acted upon by the force of flowing water against exposed outer surface and underside inner surface of the blades, respectively.

Figure 4:
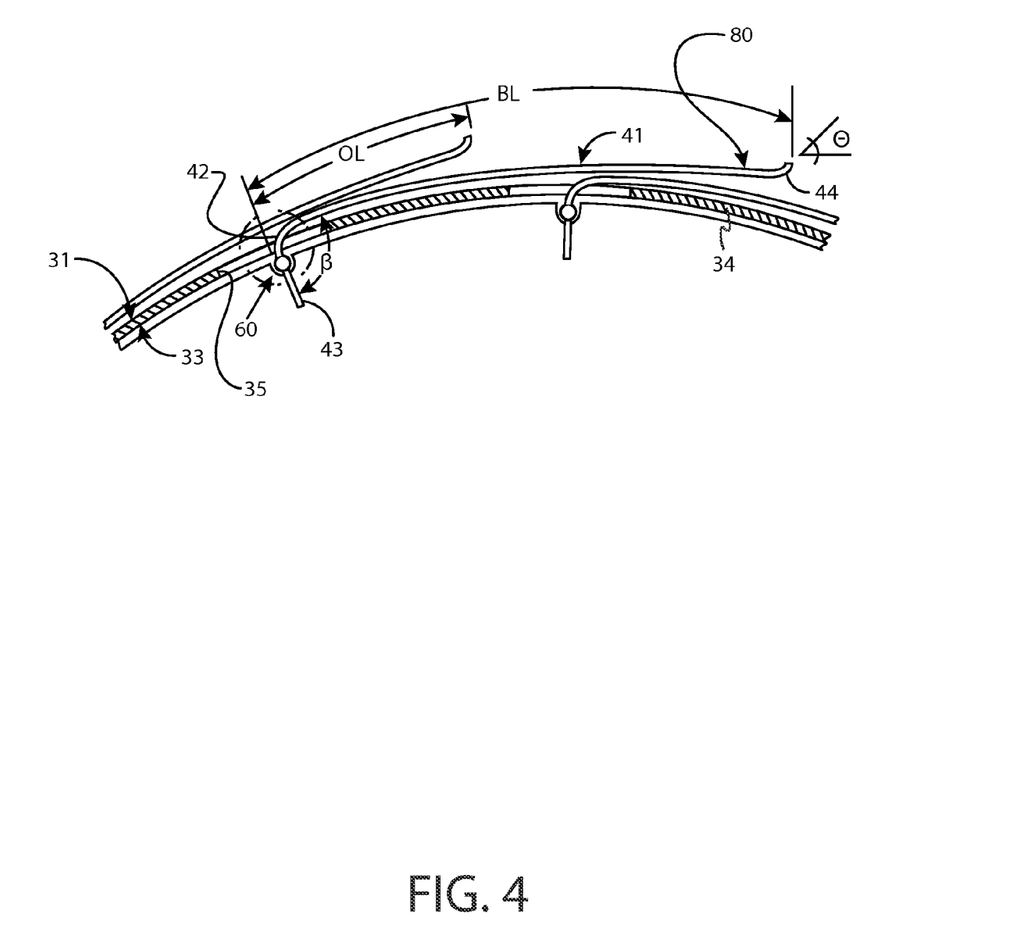
FIG. 4 is a detailed cross-sectional partial top view of the rotor and pivotable blades coupled thereto of the water turbine of FIG. 1.

FIG. 4 shows a partial top plan cross-sectional view of a portion of rotor sidewall 34 with a few blades 40 pivotably mounted thereto. FIG. 5 is a detailed view taken from FIG. 4.

Referring to FIGS. 1 and 4-5, each blade 40 generally includes an operating portion 41 disposed outside of rotor 30 which is exposed to the water current, a blade stop portion 43 disposed inside the rotor for limiting or restricting the range of motion of the blade, and a mounting portion 50 for pivotably connecting the blade to rotor 30. Each blade defines a blade height H measured parallel to the central axis CA and a blade arc length BL defined in a lateral or transverse direction to the axis CA (see FIGS. 1 and 4).

Blade stop portion 43 and operating portion 41 may be formed as parts of a single integral or unitary structure in some embodiments, or alternatively may be separate components rigidly connected together to avoid relative movement between the stop and operating portions. In the latter case, blade stop portion 43 may be welded to operating portion 41 or rigidly coupled together by other suitable mechanical means such as bolting or rivets. Accordingly, with either construction, blade stop portion 43 is simultaneously moved in direct response to and with movement of the operating portion 41 when acting upon by the water flow.

Blade stop portion 43 is disposed at an angle β to operating portion 41 as indicated in FIG. 4. Angle β is preferably less than 180 degrees, and in some embodiments may less than or equal to approximately 120 degrees, and less than or equal to about 90 degrees. In one embodiment, angle β is about 90 degrees. Angle β will be determined based on the amount of angular movement desired for operating portion 41 of blade 40 (i.e. degree of opening with respect to rotor 30) to maximize the amount of flowing fluid kinetic energy to be converted into electrical energy.

Each blade 40 is pivotably mounted to rotor 30 for opening and closing movement by mounting portion 50 of the blade which forms part of a pivot assembly 60, as further shown in FIGS. 5-7. Preferably, at least one pivot assembly 60 is provided at each one of the elongated slots 35 in the sidewall 36 of the rotor 30 (see also FIG. 2) for each blade 40, and more preferably in some embodiments at least two pivot assemblies 60 are provided for each blade.

FIGS. 6 and 7 are side elevation views showing mounting portions 50 and pivot assemblies 60 in more detail.

Referring to FIGS. 1 and 5-7, each blade 40 has at least two mounting portions 50 each associated with a pivot assembly 60 in one embodiment which defines an upper and lower mounting portion and pivot assembly disposed at the top and bottom ends 47 and 49 of the blade to securely mount the blades to rotor 30 for pivotable movement. The foregoing end mounting arrangement of the blades is intended to minimize friction between the blade 40 and rotor 30 while satisfactorily supporting the weight of the blade and forces applied to it during operation of the water turbine 20. In some possible embodiments where the height of blade 40 becomes too large, one or more intermediate pivotable mounting portions 50 may also be provided to help support the weight of the blade.

As further described herein, each mounting portion 50 of blade 40 includes a pivot pin or rod 51 as best shown in FIGS. 5-7 for movably securing the top and bottom ends 47, 49 to rotor 30. Pivot rod 51 is rigidly attached to blade 40 such as by welding or other suitable mechanical fastening means. Separate pivot rods 51 may be provided in some embodiments for each of the upper and lower mounting portions 50, or alternatively a single longitudinally-extending continuous rod may be provided which spans the entire height of each blade from top end 47 to bottom end 49. This latter arrangement can provide additional structural support for the blade 40 if needed depending on the thickness of the blade and/or type of blade material used affecting the blade's stiffness and resistance to deformation under the forces of the flowing water.

Referring now to FIGS. 1 and 4-7, each pivot assembly 60 generally includes a pivot rod 51 rigidly attached to a portion of a blade 40, a bearing 52, and a mounting flange 53 rigidly attached to rotor 30. Mounting flange 53 includes a hole 54 configured and sized to receive pivot rod 51 at least partially therethrough. The pivot rod 51 and hole 54 of flange 53 define a pivot point P for each blade 40. Rod 51 extends below the bottom end 49 of blade 40 (or top end 47 for the upper bearing assembly) for mounting through hole 54. The upper top surface of mounting flange 53 acts as a seating surface for bearing 52 as shown. Flange 53 projects radially inwards from interior surface 33 of rotor sidewall 34 and may be cantilevered as shown. Flange 53 may be formed as an integral unitary part of rotor 30 or as a separate component attached thereto by any suitable mechanical means including welding, bolting, riveting, etc. In one possible embodiment and example of the latter, mounting flange 53 may include an arcuately curved mounting base 55 (in plan view as seen in FIG. 5) which is complementary configured for attachment to arcuately curved rotor sidewall 34.

Bearing 52 may be any suitable bearing configured to receive to pivot rod 51 and supporting blade 40 on pivotable movement on mounting flange 53. It is well within the ability of those skilled in the art to select a suitable bearing for this application without further elaboration.

FIG. 7 shows a blade 40 having an upper and lower pivot assembly 60 disposed at corresponding mounting portions 50 of the blade.

As shown in FIGS. 4 and 5, operating portion 41 of each blade 40 is configured to complement the shape and arcuate curvature of the exterior surface 31 of rotor sidewall 34 to allow the blades to nest closely to the rotor when collapsed. Accordingly, in one embodiment operating portion 41 has an arcuately curved shape with an outwardly facing convex outer blade surface and opposing inwardly facing concave inner blade surface proximate to exterior surface 31 of rotor sidewall 34 and the overlapped blades. The operating portion 41 defines a leading edge 42 and a trailing edge 44 with respect to the direction of rotation of rotor 30. Part of blade 40 extends inwards through slot 35 in the sidewall 34 of rotor 30 and adjoins stop portion 43. In the non-limiting embodiment shown, stop portion 43 projects inwards from operating portion 41 into open central interior space 32 of rotor 30 and is moved back and forth simultaneously with blade 40 through angle 13 between 0 and 180 degrees to the interior surface 33 of rotor sidewall 34 (see FIG. 4) depending on the corresponding optimum position of the operating portion 41 of the blade which captures the maximum kinetic energy of the flowing fluid. In one embodiment, angle β may be about 90 degrees.

It should be noted that pivotably mounting blade 40 about a pivot point P located inside rotor 30 through use of the vertically-extending slots 35 in the rotor in combination with mounting flanges 53 advantageously allows the operating portions 41 of the blades to be more closely nested proximate to the exterior surface 31 of the rotor (see FIGS. 4-6). This presents and exposes a maximum surface area of each blade 40 to the flowing water stream or current, which in turn maximizes the motive fluid forces captured by the blade and concomitantly helps increase the energy conversion efficiency of the water turbine 20. Conversely, on the return side of rotor 30 wherein the blades 40 are in a collapsed position, this same close nesting of the blades to the rotor advantageously reduces drag on the rotor by the current to enhance efficiency.

As best shown in FIG. 4, operating portion 41 of blades 40 may have an outwardly flared trailing edge 44 comprising a reverse curvature section 80 with respect to remaining portions of blade 40 between leading edge 42 and the trailing edge. Blades with reverse curvature section 80 will start to rotate/extend outwards sooner when exposed to flow than those without reverse curvature, thereby maximizing the dynamic fluid energy captured by the blade. Trailing edge 44 is disposed at an angle θ with respect to operating portion 41 of the blade. In some representative embodiments, without limitation, angle θ may be between 0 degrees and about 45 degrees. Angle θ and the shape of the reverse blade curvature should preferably be set so that each blade experiences flowing current forces tending to extend the blade (rotate it away from the rotor) as early in the rotation cycle as possible to maximize capture of the fluid energy. The optimal shape for a given application may be determined via computerized fluid dynamics analysis, or empirical evaluations (or both).

The length of the reverse curvature section 80 may preferably be held to a minimum of the total blade arc length BL sufficient to capture the flowing current and quickly extend the blade. In one embodiment, for example, the length of the reverse curvature section of the trailing edge 44 is preferably approximately 1%-10% of the total blade length. The length and outward projection of the reverse curvature trailing edge 44 section should further be minimized to reduce drag in the fluid stream on the reverse inactive side of the rotor 30 (i.e. top segment shown in FIG. 8) where blades 40 are in a collapsed position as flow moves over the outside of the blades.

In one embodiment, the number of blades 40 and blade arc length BL of each are preferably selected so that the blades are in an overlapping arrangement as shown in FIGS. 4 and 8 with the operating portion 41 of one blade overlaying the operating portion of an adjacent blade. This overlapping blade arrangement advantageously results in larger blade areas and a greater number of blades being in a partially or fully open position at any given point in time thereby capturing more fluid flow energy than in a non-overlapping blade arrangement. This in turn maximizes the energy captured by the water turbine 20. Blades 40 are preferably equally spaced around the circumference of rotor 30 in one embodiment to balance the dynamic rotation of the water turbine 20 and achieve as close to a uniform rotational speed (RPM) when spinning allowing for variation in fluid flow velocity. The blades will be the maximum arc length BL as appropriate for the rotor diameter D to form an overlapping arrangement between adjacent blades in a preferred embodiment. Blades 40 preferably overlap and are shaped to maintain the least fluid resistance to rotor rotation by being nested as closely as possible to rotor 30. This is facilitated in one embodiment by the placement of pivot rod 51 and pivot P inside rotor 30 as described elsewhere herein, thereby advantageously allowing the arcuately curved blades 40 to lay as flat as possible against the exterior of the rotor 30 and each other.

Figure 10:
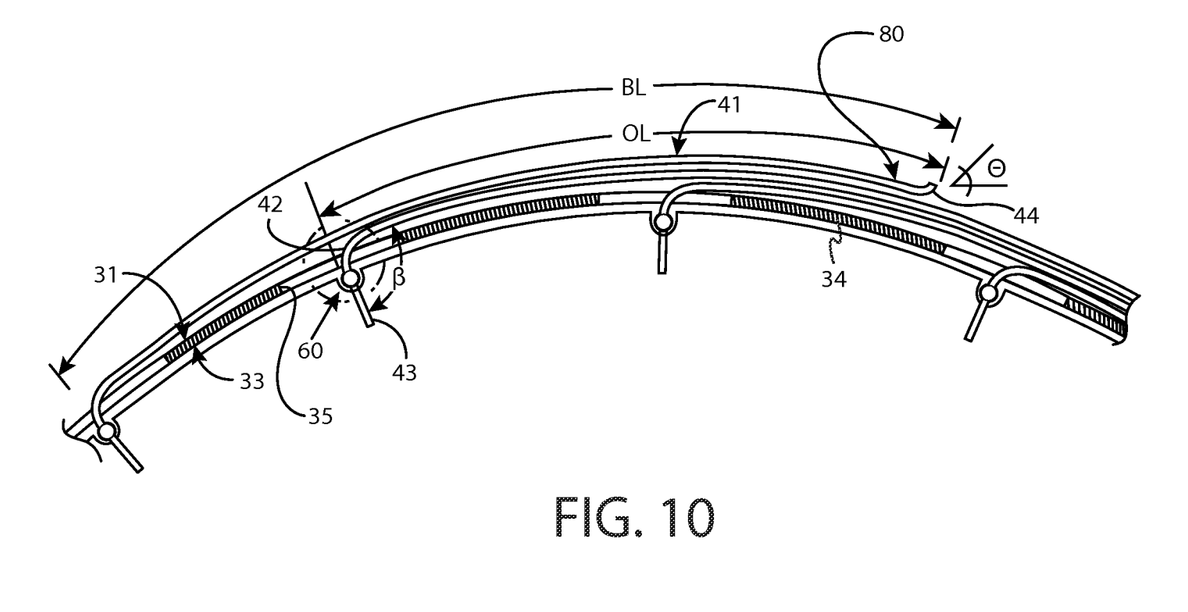
FIG. 10 is a detailed cross-sectional partial top view of an alternative embodiment of a rotor and pivotable blades coupled thereto.

Referring to FIGS. 4 and 5, blades 40 overlap by a distance defined by overlap arc length OL measured and defined herein from the leading edge 42 of the blade rearwards towards trailing edge 44. In one embodiment, leading edge 42 coincides with the angular position of pivot P. Each blade 40 has a blade arc length BL that is greater than the circumferential spacing "N" defined herein as the spacing between the blade pivot points P on rotor 30 to provide an overlapping blade arrangement (see also FIG. 8). For example, if a rotor 30 having 360 foot circumference is provided with thirty-six (36) blades 40, each blade would be pivotably mounted to the rotor every 10 degrees (i.e. 10 feet) of the total 360 degree circumference of the rotor. Accordingly, the arc length BL of each blade is preferably greater than 10 feet (i.e. greater 10 degrees of arc length) to achieve an overlapping arrangement. In some embodiments, the overlap arc length OL may be from about 25-75% of blade arc length BL (see FIG. 4 for reference). In some embodiments, the blade arc length BL is greater than 1×N the circumferential spacing of the blade pivot points P and less than 2×N. In some embodiments, the overlap arc length OL may extend over multiple blades as shown for example in FIG. 10 (wherein blade arc length BL is greater than 2×N). The blade arc length BL and overlap arc length OL ranges are functions of the rotor diameter D (or radius) and blade spacing.

The water turbine's 20 maximum output is estimated to occur when the rotor blades 40 use approximately two thirds (⅔) of the kinetic energy of the fluid flow to generate torque, and the blades rotate at a speed (i.e. angular velocity) of approximately one third (⅓) the speed of the flow in which the water turbine 20 is immersed. The blade arc length BL is generally a function of the rotor 30 radius (½ D in FIG. 3) when the water turbine 20 is set to its maximum output. That is, under those circumstances generally, neither the fluid velocity nor the blade spacing has any significant bearing. In some embodiments, the blade length BL can be up to one-half (½) the length of the rotor radius, and still be fully extended prior to reaching the 6:00 o'clock position shown in FIG. 8.

Figure 9:
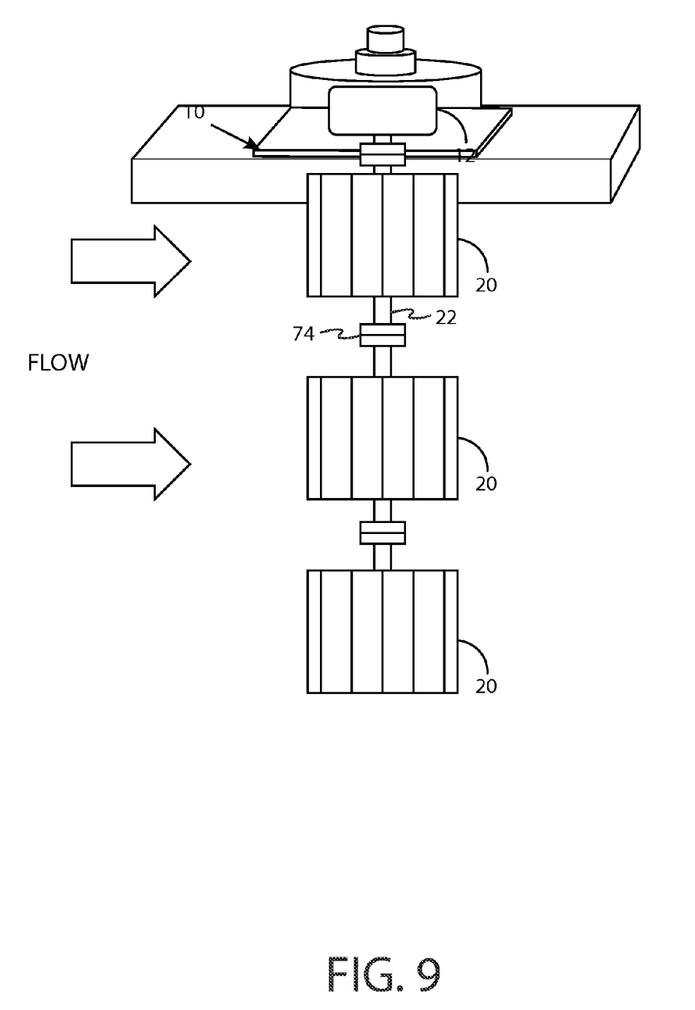
FIG. 9 is a side elevation view showing an embodiment of a hydroelectric machine having multiple vertically-stacked and coupled water turbines.

FIG. 1 shows one exemplary embodiment of a mounting arrangement of water turbine 20. Water turbine 20 is guided and supported by structural support members 70 disposed proximate to the top and bottom ends of shaft 22. Shaft 22 may rotatably coupled to a drive shaft bearing 72 such as a bearing flange in one embodiment. Other suitable shaft bearings commonly used for drive shafts may be used. FIG. 9 shows how one or more drive shaft couplings 74 may be provided as necessary to couple two or more drive shafts depending on the configuration of the water turbine 20 and generator 12 design selected.

The water turbine structural support members 70 may be one or a combination of the same or different multiple structural members of any suitable type, configuration, material, and sizes needed to satisfactorily support water turbine 20 via the shaft 22 for accommodating the static and dynamic forces imposed on the water turbine. Support members 70 may in turn be attached to a further superstructure (not shown) comprised of natural and/or artificial piers, pillars, platforms, etc. from which the water turbine 20 may be further supported. For example, in one embodiment, piers and/or platforms similar to those used for oil rigs may be one effective way for these water turbines 20 to be deployed.

In some embodiments, an array or field of multiple water turbines 20 may be provided creating a hydroelectric power system or station. Portions of the system on the upper level above the water line will house the generators that utilize the turbine's mechanical output to create electrical power. These superstructures will have pillars and/or foundations securing them to the ocean or river bed in a manner similar to oil rigs or bridges.

In some embodiments, these hydroelectric power systems or stations may be constructed with multiple vertical stories of supports like a parking garage, with each level having a turbine directly above one another on different levels, vertically coupled together via the drive shafts along the central axis of each of the rotors so that the mechanical output from the rotors are combined.

FIG. 9 shows one exemplary arrangement or embodiment of a vertically stacked and coupled water turbine 20 assembly having a plurality of water turbines coupled together via their drive shafts 22 by couplings 74. The structural support members and bearings, already described and shown herein, are omitted in the figure for clarity. The mechanical output and corresponding electric power produced will therefore be additive allowing larger megawatt (MW) capacity stations to be constructed. In some embodiments, if a low water level precludes the use of multiple vertical levels of turbines, positioning the turbines in horizontal row/configuration on a platform will also provide larger outputs.

Although water turbine 20 is shown in FIG. 1 and described herein as being oriented vertically (i.e. drive shaft 22 of turbine rotor 22 oriented vertically), it will be appreciated that other embodiments the water turbine(s) may alternatively be oriented horizontally (i.e. drive shaft 22 oriented horizontally). Accordingly, embodiments of the present disclosure are not limited to either orientation alone.

An exemplary method of operation will now be described for water turbine 20 shown in FIG. 1 which forms the motive portion of hydroelectric machine 10 for capturing fluid energy for conversion to electric power by 12. With reference to FIG. 8, the water turbine 20 in this example is configured for rotation in a counterclockwise direction in this figure. Water is flowing from left to right as shown, with the water current striking the rotor-blade assembly 30/40 at the 9 o'clock position perpendicular to the flow on the upstream side. As the moving current of water W impinges the reverse-curved trailing edges 44 of each blade 40 (see FIG. 4), the dynamic force of the current will catch and work beneath the blade thereby gradually pivoting the blades outwards in a radial direction away from rotor 30 against the static force of the water on the blades towards an open or extended position. When the stop portion 43 of each opening blade engages the interior surface 34 of the rotor, the pivotable movement of the blade stops and the blade reaches maximum extension. The fluid energy captured by the blade 40 is transmitted to the rotor 30 through the engagement of the stop portion 43 with the rotor and the pivot assemblies 60 connecting blades to the rotor body. This causes the rotor 30 to rotate in a counterclockwise direction as shown in FIG. 8.

As the blades near the downstream side of the rotor-blade assembly 30/40, the blades will move towards a closed or collapsed position being forced back inwards against or proximate to the rotor 30 once the moving current no longer is sufficient to impinge the blades to overcome the static force of the water against the blade. In one embodiment, the blades will tend to be fully closed when they reach the 3 o'clock position shown in FIG. 8 once again being perpendicular to the direction of flow, but now shielded from the current by the rotor. The blades 40 will remain in a closed and nested position as the flowing current strikes the exposed exterior of the blades as the rotor 30 rotates around until the blades again reach a point beyond and below the 9 o'clock position perpendicular to the moving current shown in FIG. 8. The blade opening and closing cycle is repeated as the rotor 30 rotates resulting in a continuous rotation of the rotor and transmission of fluid energy to the generator 12 via the drive shaft 22 of the rotor.

The components, devices, and structured disclosed herein may be made of any suitable material known in the art appropriate for the given application and operating environment. For example, wetted components such as the water turbine 20 including rotor 30 and blades 40 may be made from any suitable corrosion resistant materials and/or materials provided with corrosion resistant outer coatings or paint. Some exemplary materials that may be used include without limitation stainless steel, titanium, or aluminum (and alloys thereof), or steel with a corrosion resistant paint or epoxy coating. In some instances, polymeric materials may be used for various components to provide protection against corrosion. Accordingly, embodiments of a hydroelectric machine and water turbine according to the present disclosure are not limited to any particular materials.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes and/or control logic as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A water turbine configured for immersion in a flowing body of water, the water turbine comprising:
   a rotatable cylindrical rotor including a drive shaft defining an axis of rotation and a solid circumferentially extending circular sidewall having an interior surface and an exterior surface, the sidewall extending from a top end to a bottom end of the rotor;
   a plurality of vertically elongated through slots formed in the sidewall of the rotor that extend between the top and bottom ends of the rotor for a majority of a height of the rotor, the through slots spaced circumferentially around the rotor and extending through the interior and exterior surfaces of the sidewall;
   a plurality of arcuately curved blades each pivotably mounted to the rotor about a pivot point positioned inside the rotor adjacent a through slot, each blade extending radially through one of the through slots formed in the sidewall of the rotor, the blades each being moveable between a retracted closed position and an extended open position operable for capturing flowing water;
   the blades each including an operating portion disposed outside the rotor configured to capture flow and a stop portion disposed inside the rotor configured to limit the radial extension of the blades;
   the blades being configured and arranged so that each blade at least partially overlaps and contacts the operating portion of an adjacent blade when in the closed position;
   wherein the blades sequentially move between the closed and open positions as the rotor rotates when exposed to flowing water.

2. The water turbine of claim 1, wherein the blades include a reverse curvature section operable to capture flowing water for initiating pivotable movement of the blades outwards from the rotor to the open position.

3. The water turbine of claim 1, wherein the rotor includes an open central interior space bounded by the circumferentially extending circular sidewall.

4. The water turbine of claim 3, wherein the pivot point of each blade is disposed inside the interior space inside the rotor.

5. The water turbine of claim 1, wherein:
   the rotor has an open cylindrical configuration with the top and bottom ends being open
   the blades each include a stop portion disposed inside the rotor that is engageable with an interior surface of the sidewall of the rotor.

6. The water turbine of claim 5, wherein when the blades are in a fully open position, the stop portion engages the interior surface of the sidewall of the rotor.

7. The water turbine of claim 5, wherein the stop portion of the blades are adjoined to the operating portion of the blades through the slots.

8. The water turbine of claim 1, wherein each slot has an associated mounting flange, the blades each being freely and pivotably coupled to the mounting flanges by a pivot pin.

9. The water turbine of claim 1, wherein the mounting portions are circumferentially spaced at equal intervals around the rotor.

10. The method of claim 1, wherein each blade overlaps at least two adjacent blades when in the closed position disposed proximate to the rotor.

11. A hydroelectric machine comprising:
    an electric generator;
    a rotatable tubular rotor including a drive shaft coupled directly or indirectly to the generator, the rotor being configured for immersion in flowing water;
    the rotor including a solid circumferentially extending circular cylindrical sidewall having an interior surface and an exterior surface, the sidewall extending from a top end to a bottom end of the rotor;
    a plurality of elongated through slots formed in the sidewall of the rotor that extend between the top and bottom ends of the rotor for a majority of a height of the rotor, the through slots spaced circumferentially around the rotor and extending through the interior and exterior surfaces of the sidewall;
    a plurality of arcuately curved blades each pivotably mounted to the rotor about a pivot point positioned inside the rotor adjacent a through slot, each blade extending radially through one of the through slots formed in the sidewall of the rotor, the blades each being moveable between a retracted closed position and an extended open position for capturing the flowing water;
    the blades each including an operation portion disposed outside the rotor configured to capture flow and a stop portion disposed inside the rotor configured to limit the radial extension of the blades;
    the blades being configured and arranged so that each blade at least partially overlaps and contacts an operating portion of an adjacent blade when in the closed position;
    wherein the blades sequentially move between the closed and open positions as the rotor rotates when exposed to flowing water.

12. The hydroelectric machine of claim 11, wherein the blades include a reverse curvature section operable to capture flowing water for initiating pivotable movement of the blades outwards from the rotor to the open position.

13. The hydroelectric machine of claim 11, wherein the rotor includes an open central interior space bounded by the circumferentially extending circular sidewall.

14. The hydroelectric machine of claim 13, wherein the the pivot points being disposed inside the interior space inside the rotor.

15. The hydroelectric machine of claim 11, wherein:
    the rotor has an open cylindrical configuration; and
    the blades each include a stop portion disposed inside the rotor that is engageable with an interior surface of the sidewall of the rotor.

16. The hydroelectric machine of claim 15, wherein when the blades are in a fully open position, the stop portion engages the interior surface of the sidewall of the rotor.

17. The hydroelectric machine of claim 15, wherein the stop portion of the blades are adjoined to the operating portion of the blades through the slot.

18. The hydroelectric machine of claim 11, wherein each slot has an associated mounting flange, the blades each being pivotably coupled to the mounting flanges by a pivot pin.

19. The hydroelectric machine of claim 11, wherein the mounting portions being circumferentially spaced at equal intervals around the rotor.

20. A method for capturing fluid energy from flowing water comprising:
    providing a water turbine including a substantially hollow cylindrical rotor having a plurality of arcuately curved blades pivotably coupled to the rotor, the blades each being moveable between closed and open positions;

the rotor including a drive shaft defining an axis of rotation and a solid circumferentially extending circular sidewall having an interior surface and an exterior surface, the sidewall extending from a to end to a bottom end of the rotor;
a plurality of vertically elongated through slots formed in the sidewall of the rotor that extend between the top and bottom ends of the rotor for a majority of a height of the rotor, the through slots spaced circumferentially around the rotor and extending through the interior and exterior surfaces of the sidewall;
the blades each pivotably mounted to the rotor about a pivot point positioned inside the rotor adjacent a through slot, each blade extending radially through one of the through slots formed in the sidewall of the rotor, the blades each being moveable between a retracted closed position and an extended open position operable for capturing flowing water;
the blades each including an operating portion disposed outside the rotor configured to capture flow and a stop portion disposed inside the rotor configured to limit the radial extension of the blades;
immersing the water turbine into a body of flowing water;
pivoting at least one blade outwards from the rotor by exposing the blade to the flowing water;
engaging an interior surface of the rotor with a stop portion of the blade; and
rotating the rotor about a rotational axis;
wherein each blade at least partially overlaps and contacts an operating portion of an adjacent blade when in the closed position disposed proximate to the rotor.

* * * * *